Aug. 18, 1953     C. D. SHELBURNE     2,649,257
FISHING REEL
Filed April 2, 1948                         2 Sheets-Sheet 1
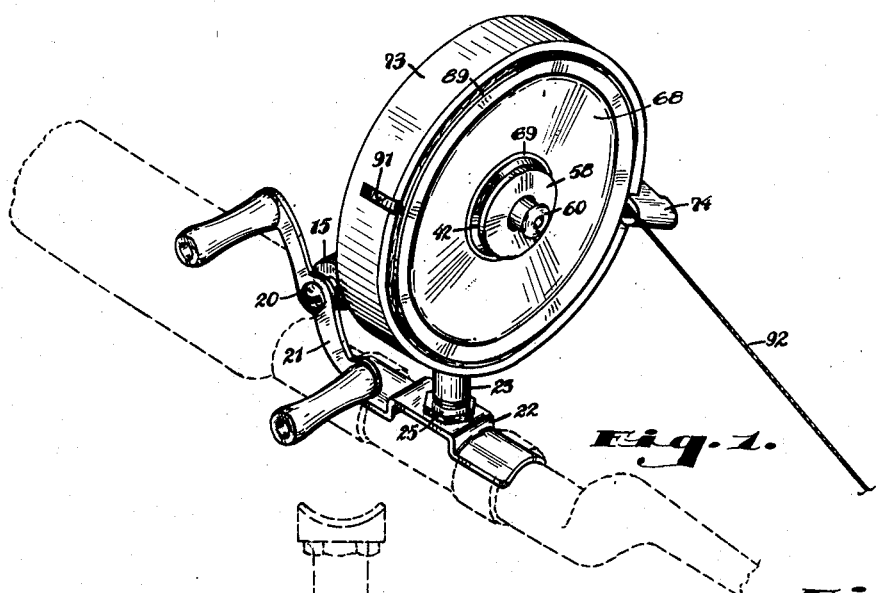
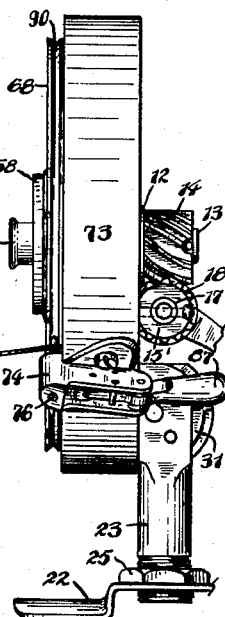
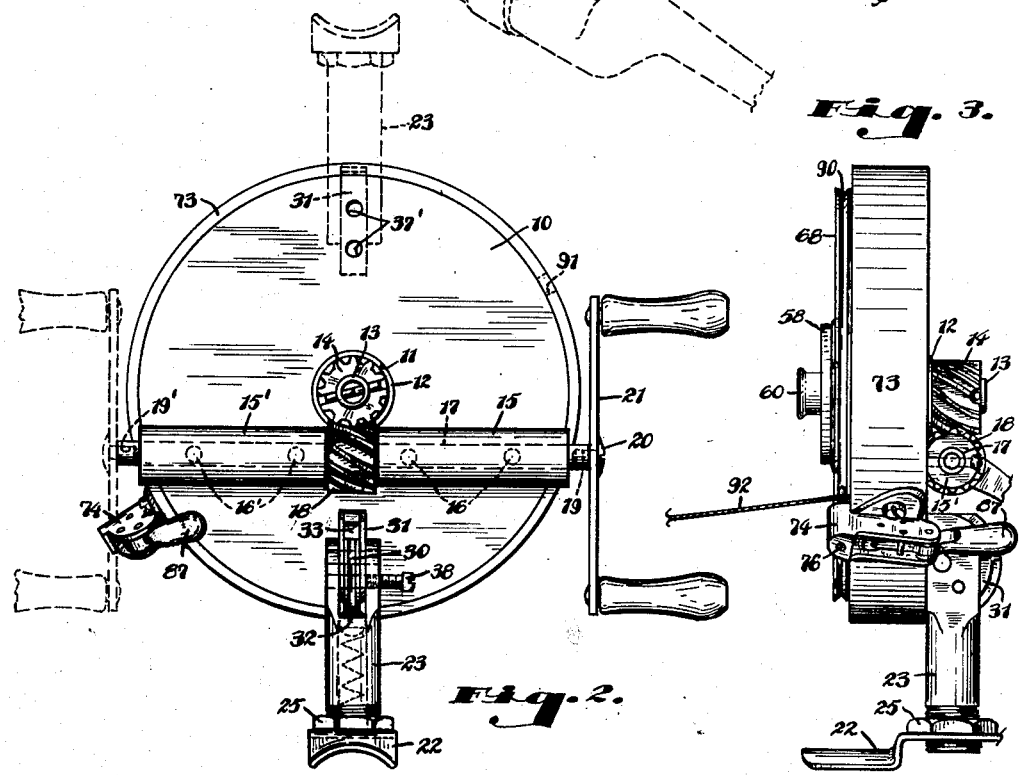
INVENTOR.
CLYDE D. SHELBURNE,
BY: Harold B. Hood.
ATTORNEY.

Aug. 18, 1953     C. D. SHELBURNE     2,649,257
FISHING REEL
Filed April 2, 1948     2 Sheets-Sheet 2
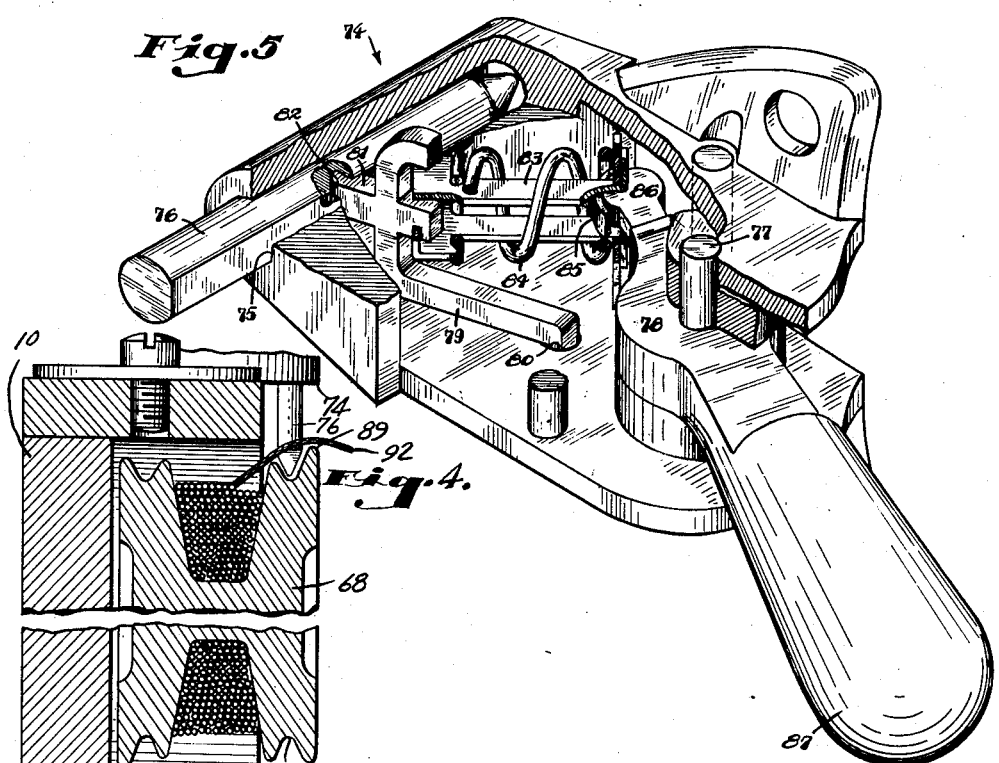
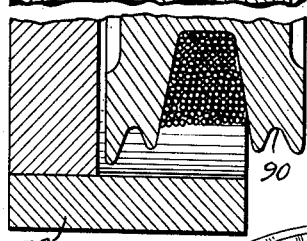
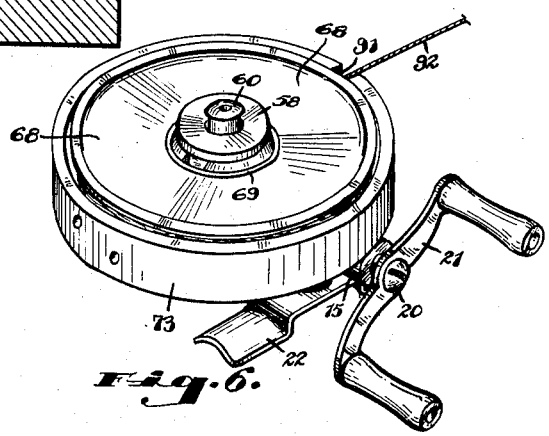
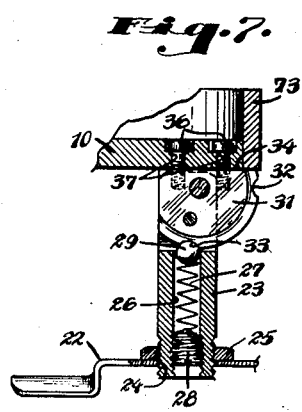
INVENTOR.
CLYDE D. SHELBURNE,
BY: Harold B. Hood
ATTORNEY.

Patented Aug. 18, 1953

2,649,257

UNITED STATES PATENT OFFICE 2,649,257

FISHING REEL

Clyde Duffield Shelburne, Shelburn, Ind.

Application April 2, 1948, Serial No. 18,649

4 Claims. (Cl. 242—84.1)

The present invention relates to a spinner-type reel, and is primarily concerned with the provision of various improvements over known embodiments of that type of reel, to overcome the recognized defects and disadvantages of spinner-type reels heretofore known. A spinner-type reel, used in bait casting or fly casting, is of such construction that the line may be drawn off the spool in the direction of the spool axis, without causing rotation of the spool, and in which the line is returned to the spool either by rotating the spool or by rotating a flier whose path circumscribes the spool. My invention is concerned with the former type of reel, in which the spool is rotated in returning the line to the spool.

An object of the invention is to provide improved catch means for restraining the line as the spool is rotated during recovery. A further object of the invention is to provide a reel of the character under consideration, so mountable upon the rod that its position may be adjusted with respect to the rod in order to facilitate line flow from and to the spool. A further object of the invention is to provide a mounting for a reel which will permit the reel to be shifted between a position in which its spool axis is parallel with the rod axis, and a position in which its spool axis is perpendicular to the rod axis.

A further object of the invention is to provide an improved actuating mechanism for a catch pin whereby, by a simple flick of a thumb or finger of the hand grasping the rod, the catch pin may be shifted, quickly and certainly, from either of its extreme positions to the other.

Further objects of the invention are to provide improvements and refinements in the construction of reels of the character here under consideration. To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a perspective view of a reel constructed in accordance with my invention, showing, in dotted lines, a more or less diagrammatic representation of a rod with which such a reel may be associated;

Fig. 2 is a rear elevation of my reel;

Fig. 3 is a side elevation thereof;

Fig. 4 is a broken longitudinal section showing a preferred relationship between a spool and the catch pin of my invention;

Fig. 5 is a greatly enlarged, broken, perspective view of my catch pin and the actuating mechanism therefor;

Fig. 6 is a reduced perspective view of my reel in the position in which the spool axis is perpendicular to the rod axis; and Fig. 7 is a vertical section through the mounting bracket, showing the means whereby the reel is mounted for shifting between its two positions relative to the mounting bracket.

Referring more particularly to the drawings, it will be seen that my reel comprises a base 10 which preferably takes the form of a circular disc having a central opening 11 therein in which is preferably mounted a bearing bushing 12. Journalled in said bushing is an axle 13, concentric with the base 10, and projecting forwardly and rearwardly from said base. On its rear end, the axle 13 has fixed thereto a gear 14.

Mounted in a chordal position upon the rear face of the base 10 are two cylindrical housings 15 and 15', secured to the base by screws 16 and 16', or the like, and providing a journal mounting for a shaft 17 which projects equally beyond the remote ends of said housings 15 and 15'. At the center of the shaft, and between the housings 15 and 15', there is fixed to the shaft 17 a gear 18 having a driving mesh with the gear 14. At each end of the shaft 17 there is provided a tapped socket 19 or 19' for the alternative reception of a screw 20 securing to said shaft a crank handle 21.

A bracket 22 of conventional form, adapted to be located upon a reel seat of any conventional fishing rod, carries a standard or post 23, the offset mid-portion of said bracket being formed with a threaded aperture 24 in which the lower threaded end of the post 23 is adjustably mounted and adapted to be secured in any desired position of adjustment by a lock nut 25. The post 23 is formed with a bore 26 in which is received a spring 27, adjustably backed by a screw 28 and bearing against a ball 29. The ball 29 rides in a groove 30 formed in the arcuate, perimetral edge of a sector 31 pivotally mounted at the upper end of the post 23; and the groove 30 is formed with two seats or notches 32 and 33, spaced 90 degrees apart. Obviously, the ball 29, engaging in one or the other of the notches 32 and 33, will tend to hold the sector 31 in either of its two limiting positions of adjustment.

The sector 31 is formed with a flat surface 34, diametrically opposite the seat 33, against which the rear surface of the base 10 is adapted to be secured by a plurality of screws 36, or other equivalent fastening means passing through apertures 37 formed in said base. In this fashion, the base 10 is mounted to assume either the position illustrated in Fig. 1, in which it lies in a plan transaxially perpendicular to the axis of the rod with which the reel is associated, or the position of Fig. 6, in which the base lies in a plane parallel with the rod axis, and the axis of the axle 13 is perpendicular to said rod axis. I prefer to provide a set screw 38 whereby the sector 31 may, if desired, be locked in any position of adjustment relative to the post 23. It will be clear from an inspection of Fig. 7 that the arcuate, perimetral surface of the plate 31 lies in a plane which, when the bracket 22 is in place on a rod, includes the rod axis, and which is perpendicular to the plane of the base 10; and that the pivotal axis of said plate is parallel with the plane of said base and transaxial with respect to the rod.

The axle 13 is formed with an enlargement providing a substantially cylindrical friction surface of substantial axial length and chamfered at its outer end, as at 42.

A plug 58 has a press fit in the outer end of the axle enlargement, and is formed with a central aperture in which is reciprocably mounted a button 60.

A spool 68 is adapted to be sleeved upon the cylindrical surface of the enlargement of the axle 13. In its preferred form, the spool will be formed with a central bushing 69 formed for cooperation with latch means (not shown) carried by the axle and actuable by the button 60 to release the spool for ready removal and reversal. It will be clear that the spool may be mounted upon the axle with either of its end faces adjacent the base 10. The chamfer 42 facilitates the sleeving of the spool bushing 69 onto the enlargement of the axle.

An annular ring member 73 is associated with the base, and is so proportioned and designed that, when in position, it peripherally overlies the spool 68, restraining the line against undue radial movement, under the influence of centrifugal force as line is stripped from the spool.

When line is to be recovered with the reel in the position of Fig. 1, it is necessary to provide means bridging the radial space between the spool periphery and the ring 73. I have provided a novel bridging means which is illustrated in detail in Fig. 5.

A housing 74 is secured to the outer periphery of the ring 73. The ring 73 is preferably mounted upon the periphery of the base 10 with a friction-press fit, so that it is universally adjustable peripherally and axially relative to said base. Thus, the housing 74 may assume any desired position with relation to the crank arm 21.

The housing 74 is formed with a bore 75 which, when the housing is mounted upon the ring 73, extends substantially radially with respect to the axis of the axle 13. I presently believe that it may be desirable to incline the bore 75 slightly in a direction opposed to the direction of winding rotation of the spool 68.

Reciprocably mounted in the bore 75 is a catch pin 76 of such length that it may be projected from the bore 75 far enough to bridge the radial space between the spool periphery and the ring 73. Pivotally mounted in the housing 74, upon a pin 77, for instance, is a lever 78; and a second lever 79, generally of U-shape, has its legs (only one of which is shown) pivotally received in openings 80 in the walls of the housing 74. A finger 81 at the opposite end of the lever 79 engages in a notch 82 in the pin 76.

A toggle link 83 is pivoted to the lever 79, substantially at the base of the U, and guides a shoe 85 for reciprocatory movement longitudinally of said link, said shoe being urged away from the finger 81 by a spring 84 sleeved upon the link 83. One arm 86 of the lever 78 operatively engages the lower face of said shoe, while the other arm 87 projects to a substantial degree beyond the rear face of the base 10 (see Fig. 3). With the lever 78 in its illustrated position, the pin 76 will be in its retracted position. If, however, the arm 87 is shifted toward the axis of the spool 68, the toggle link 83 will thereby be shifted into a position in which the spring 84 will press upon the lever 79 in a direction to move its finger 81 toward the right, as viewed in Fig. 5; and the action of the spring 84 will thereby snap the pin 76 toward the right to project the nose of said pin to the opposite limit of its stroke. If desired, the parts may be so related that such projection of the pin 76 will carry the nose thereof into overlapping relation with the outer face of the spool 68; but I prefer to form each rim flange of the spool with a peripheral groove, such as that illustrated at 90 in Figs. 3 and 4, the groove in the currently forward flange of the spool registering with the pin 76, so that the nose of said pin actually enters the groove in the spool rim in the manner illustrated in Fig. 4.

If the arm 87 of the lever 78 is now returned to its position illustrated in Fig. 5, the toggle mechanism will snap the pin 76 back to its illustrated, retracted position.

Preferably, the outer flange 89 of each spool rim groove will be slightly eccentric, so that, upon each rotation of the spool, the line 92 will be pushed radially outwardly, and so upon the pin 76, when said pin is in its bridging position.

If desired, the user may dispense with the housing 74 and its associated parts. For such use, the ring 73 will be adjusted, as shown in Fig. 6, to bring its notch 91 into substantial alignment with the rod. The set screw 38 being loosened, the reel will be positioned as shown in Fig. 1 for casting; and for recovery, it will be shifted to the position of Fig. 6. So long as the reel is in the position of Fig. 1, line can be stripped therefrom without rotation of the spool; but when the reel is shifted to the position of Fig. 6, rotation of the spool will recover line 92. The shifting of reel position is very simple, and the reel will naturally snap into optimum positions at both ends of its range of movement because of the provision of the mechanism illustrated in Fig. 7.

The reel may be mounted to project above the rod, in the manner illustrated in Fig. 1, or it may be mounted to project below the rod. If it is mounted in the latter position, without other modifications, it will be clear that the direction of rotation of the shaft 17 for recovery of line will thereby be reversed. In order to overcome that disadvantage, I provide the base 10 with a second pair of screw holes 37', 180° removed from the positions of the holes 37; and the sector 31 will be secured to the base through the holes 37', instead of through the holes 37, when the reel is to be mounted in a dependent position.

It will be clear that the handle 21 may be shifted from end to end of the shaft 17 without reversing the direction of shaft and spool rotation.

The mounting means whereby the spool 68 is associated with the axle 13 is preferably of such character as to provide a friction clutch between the crank handle 21 and the spool. It may be desirable, at times, to provide for direct manipulation of the spool 68, independent of such friction connection. For that purpose, I may provide a knob or handle (not shown) fixed to each end surface of the spool 68 and shiftable into and out of flush relation with its associated surface.

It will be apparent that the means for retaining the spool in position on the axle is such as to facilitate frequent reversals of the spool upon the axle. All the fisherman needs to do, in order to reverse the spool position and thereby eliminate twist and kink in his line, is to press the button 60, whereupon the spool will be released so that it can be readily grasped, drawn off the axle, reversed, and replaced upon the axle. As the spool is pressed home, in its new relation, latch controlled by the button 60 will engage the spool to retain it, whereupon the fisherman may make his new cast and proceed to recover his line, without interference, and automatically restore an untwisted condition of his line.

I claim as my invention:

1. A spinner reel comprising a base, an axle journal mounted on said base, a spool mounted on said axle for rotation therewith, an annular member carried by said base, axially overlying the periphery of said spool, and radially spaced from said spool, a line wound on said spool and leading through the radial space between said member and the periphery of said spool, and a catch pin carried on said member and shiftable substantially radially of said spool into and out of a position bridging said radial space; and in which said base is in the form of a circular disc, said axle is concentric therewith, and said annular member has a friction-press fit upon the periphery of said base for independent peripheral and axial adjustment relative to said base.

2. A spinner reel comprising a base, an axle journal mounted on said base, a spool mounted on said axle for rotation therewith, an annular member carried by said base, axially overlying the periphery of said spool, and radially spaced from said spool, a line wound on said spool and leading through the radial space between said member and the periphery of said spool, a housing, means securing said housing to the outer wall of said annular member to project beyond that end of said member remote from said base, a catch pin reciprocably mounted in the projecting portion of said housing and shiftable substantially radially of said spool into and out of a position bridging said radial space, a lever pivotally mounted in said housing and having an arm projecting beyond the opposite end of said member, and toggle means operatively connecting said lever to shift said pin between its opposite extreme positions.

3. The reel of claim 2 in which said base is in the form of a circular disc, said axle is concentric therewith, and said annular member is frictionally mounted upon the periphery of said base for independent peripheral and axial adjustment relative to said base.

4. A spinner reel comprising a base, an axle journal mounted on said base, a spool mounted on said axle for rotation therewith, an annular member carried by said base, axially overlying the periphery of said spool, and radially spaced from said spool, a line wound on said spool and leading through the radial space between said member and the periphery of said spool, and a catch pin carried on said member and shiftable substantially radially of said spool into and out of a position bridging said radial space; and in which said spool is provided with a radially outwardly-opening annular groove registering with said catch pin and enterable by said pin when said pin is in bridging relation to said radial space, said groove being bounded by an eccentric flange.

CLYDE DUFFIELD SHELBURNE.

References Cited in the file of this patent

UNITED STATES PATENTS

| Number | Name | Date |
|---|---|---|
| 1,114,084 | Wells | Oct. 20, 1914 |
| 1,678,710 | Selvig | July 31, 1928 |
| 2,083,689 | Clifford | June 15, 1937 |
| 2,392,612 | Olson | Jan. 8, 1946 |
| 2,439,298 | Horan | Apr. 6, 1948 |
| 2,507,457 | Rix | May 9, 1950 |
| 2,512,170 | Oen | June 20, 1950 |
| 2,522,897 | Rotter | Sept. 19, 1950 |

FOREIGN PATENTS

| Number | Country | Date |
|---|---|---|
| 183,277 | Great Britain | July 27, 1922 |
| 813,087 | France | Feb. 15, 1937 |
| 915,914 | France | Aug. 5, 1946 |